United States Patent [19]

Hinkston

[11] Patent Number: 5,536,033
[45] Date of Patent: Jul. 16, 1996

[54] COLLAPSIBLE BABY JOGGING STROLLER

[76] Inventor: Paul Hinkston, 2554 Lincoln Blvd., #73, Marina del Ray, Calif. 90292

[21] Appl. No.: 304,924
[22] Filed: Sep. 13, 1994
[51] Int. Cl.⁶ ..................................................... B62B 7/06
[52] U.S. Cl. ........................... 280/642; 280/650; 280/62; 301/111
[58] Field of Search ............................ 280/62, 650, 658, 280/642, 47.38, 644; 301/111, 112, 125; D12/129

[56] References Cited

U.S. PATENT DOCUMENTS

| D. 297,525 | 9/1988 | Baecher | D12/129 |
|---|---|---|---|
| 5,188,389 | 2/1993 | Baechler et al. | 280/650 |
| 5,299,825 | 4/1994 | Smith | 280/650 |
| 5,356,171 | 10/1995 | Schmidlin et al. | 280/650 |

*Primary Examiner*—Richard M. Camby
*Attorney, Agent, or Firm*—Edward E. Roberts

[57] ABSTRACT

A three-wheeled jogging stroller with demountable wheels, a removable cloth-like seat and a collapsible frame assembly. The frame assembly includes a primary structural rear axle assembly having a member of an enlarged diameter tubular construction with couplers at opposite ends thereof for supporting demountable or removable large diameter spoked wheel pneumatic tires with the axles thereof canted so that the wheels are downwardly divergent relative to the ground. The rear axle assembly has pivotally coupled thereto a pair of upright support members and a fork assembly. A pair of generally parallel fork members support the removable front wheel at one end thereof, while at the other end, the fork members are pivotally coupled to the rear axle member by means so that the pivotable coupling is displaced, or offset, a given distance from the axis of the rear axle member so that, on folding, the fork and the upright support members are generally parallel to one another. The handlebar assembly includes a first generally U-shaped handlebar member and a second tubular portion including first and second tubes having first ends thereof pivotally coupled to support members attached at the forward end of the fork, the other ends of each of the tubes being fixedly coupled to an interconnect member, to which is pivotally couples the upper U-shaped handlebar portion which includes handle gripping material thereabout.

28 Claims, 6 Drawing Sheets

COLLAPSIBLE BABY JOGGING STROLLER

BACKGROUND OF THE INVENTION

The background of the invention will be discussed in two parts.

1. Field of the Invention

This invention relates to baby carriages or strollers, and more particularly to a stroller for an infant, which stroller may be utilized during jogging exercise.

2. Description of the Prior Art

Baby strollers are conventionally configured with a seating area for the infant and three or four wheel assemblies, which are sometimes arranged in pairs of wheels per assembly. In recent times, with physical fitness in mind, strollers have evolved into devices when can be utilized while running or jogging. Such vehicles are referred to as jogging strollers, whereby the parent, or other person, while pushing the infant therein, may conveniently exercise by jogging, or even running.

To provide a stable platform for the stroller, the stroller design includes pneumatic spoked wheel tires of large diameter, approximating that of an elementary school child's bicycle. Furthermore, to provide a lightweight stroller, the construction of the seating portion is usually a flexible cloth-like material, while the frame assembly is formed of a tubular construction, such as aluminum tubes, which provide strength, as well as a light weight for the vehicle. Some such jogging strollers may be disassembled or folded, or a combination of both, for storage or transportation, that is, it a stowable.

In accordance with an aspect of the invention, there is provided a jogging stroller with removable wheels and a collapsible frame which may be readily assembled and disassembled, which stroller is compact, stable and lightweight.

SUMMARY OF THE INVENTION

In accordance with the invention there is provided a three-wheeled jogging stroller with demountable or removable wheels, a removable cloth-like seat and a collapsible frame assembly. The frame assembly includes a primary structural rear axle assembly having a member of an enlarged diameter tubular construction with couples at opposite ends thereof for supporting demountable or removable large diameter spoked wheel pneumatic tires with axles thereof canted so that the wheels are downwardly divergent relative to the ground. The rear axle assembly has pivotally coupled thereto a pair of upright support members and a fork assembly. A pair of generally parallel fork members support the removable front wheel of the three wheels at one end thereof, while at the other end, the fork members are pivotally coupled to the rear axle member by means of crank or clevis members so that the pivotable coupling is displaced, or offset, a given distance from the axis of the rear axle member, so that, on folding, the fork and the upright support members are generally parallel to one another. The handlebar assembly includes a first generally U-shaped handlebar member and a second tubular portion including first and second tubes having first ends thereof pivotally coupled to support members attached at the forward end of the fork, the other ends of each of the tubes being fixedly coupled to an interconnect member, to which is pivotally coupled the free ends of the arms of the upper U-shaped handlebar portion which includes handle gripping material thereabout as well as a brake lever for a caliper type brake which engages the rim of the front wheel.

Other objects, features and advantages of the invention will become apparent from a reading of the specification, when taken in conjunction with the drawings, in which like reference numerals refer to like elements in the several views.

DESCRIPTION OF THE PREFERRED EMBODIMENT

Figure 1:
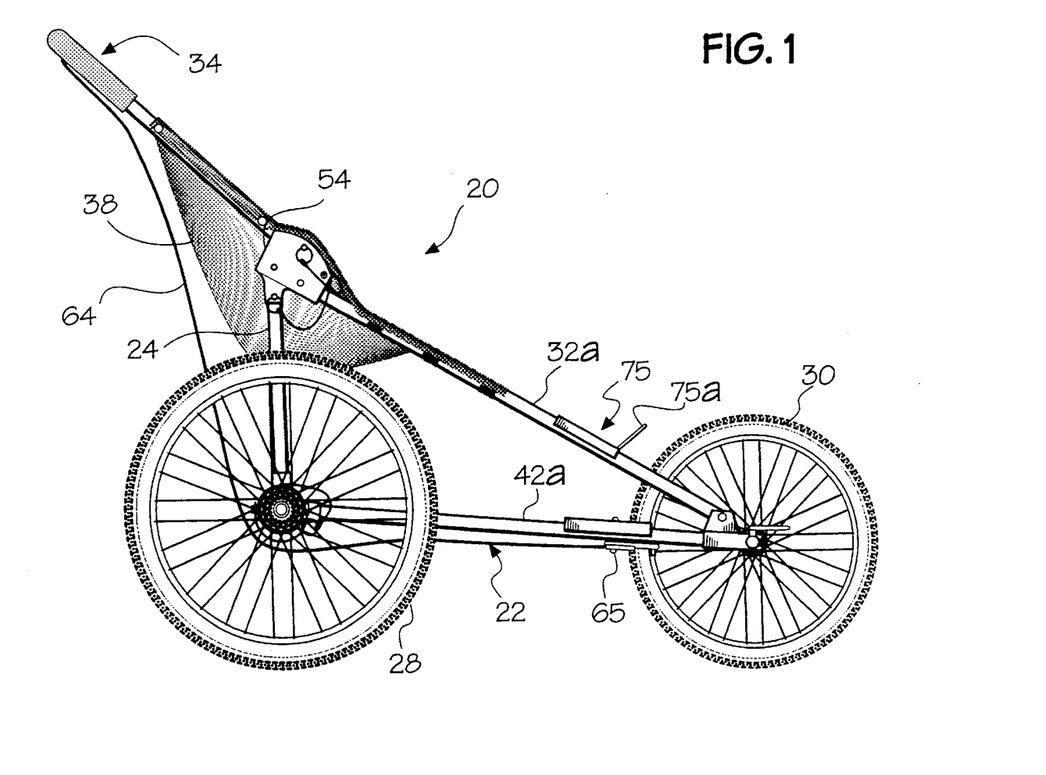
FIG. 1 is a side elevational view of the collapsible baby jogging stroller according to the invention.
Figure 2:
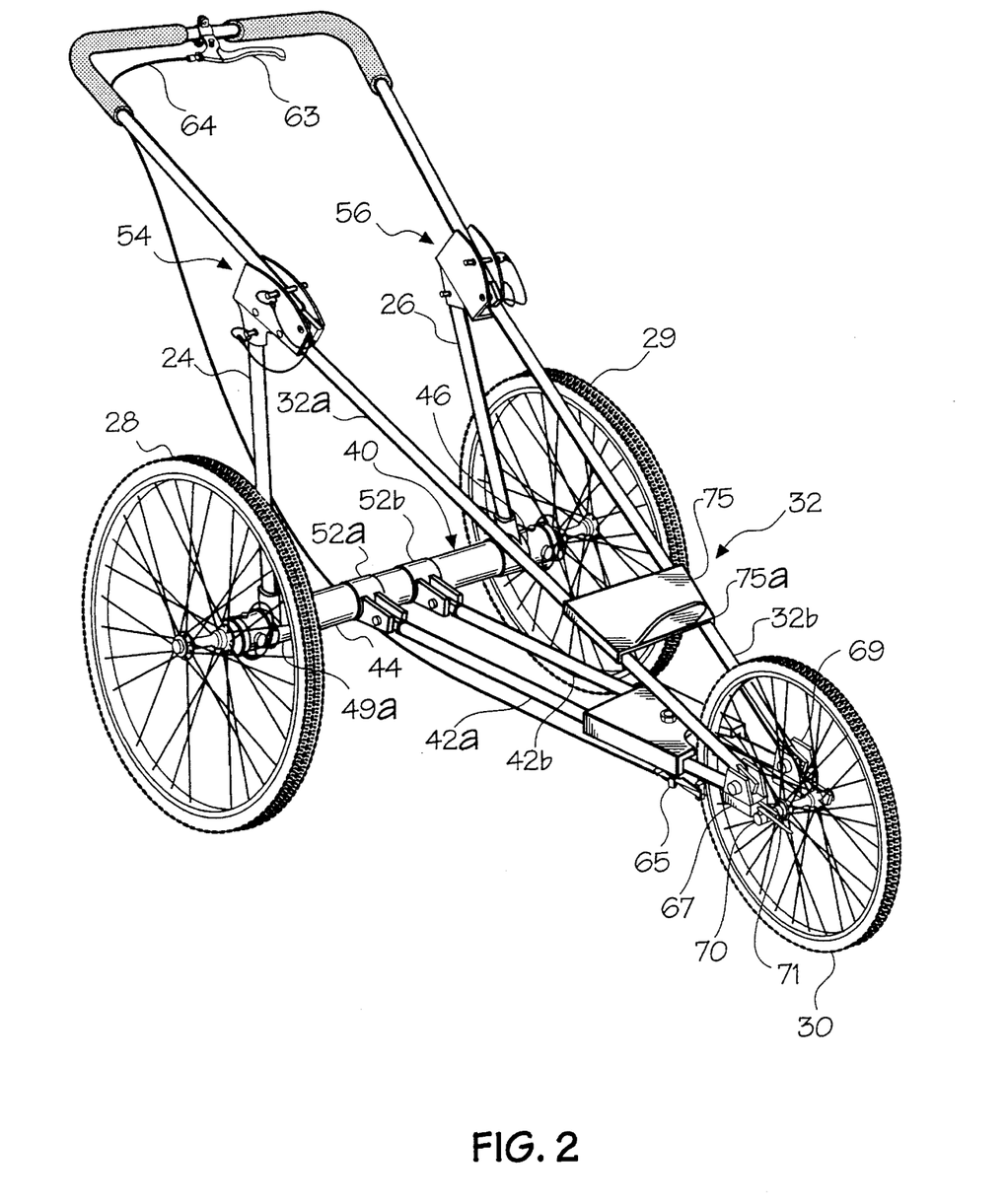
FIG. 2 is a perspective view of the collapsible frame of the stroller of FIG. 1.

Referring now to the drawings, and particularly to FIGS. 1 and 2, there is shown a three-wheeled jogging stroller, generally designated 20, which includes a wheel support frame assembly, generally designated 22; upright tubes 24, 26, pneumatic tire wheels 28–30, a two part tubular handlebar assembly, generally designated 32, 34, and a flexible cloth-like seat 38.

Figure 3:
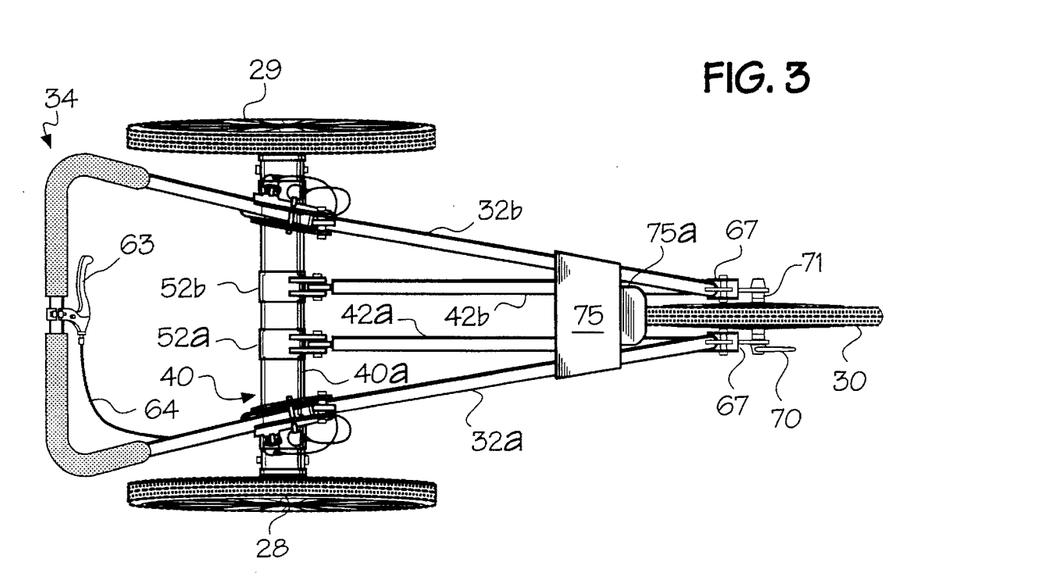
FIG. 3 is a top plan view of the collapsible frame of FIG. 2.

As best shown in FIGS. 2 and 3, the wheel support assembly 22 includes a primary structural rear axle assembly 40, and a front wheel 30 fork consisting of first and second generally parallel fork tubes 42a, 42b. The rear axle assembly has a relatively large diameter (2.5–4.0"") tube 40a, with a plurality of fixed couplers attached thereto, the couplers including first and second upright 24, 26 couplers 44, 46, and fork member 42a, 42b couplers 52a, 52b. The rear wheels 28, 29, as will be hereinafter described, include detachable axle stubs which are inserted into opposite ends of the rear axle assembly 40 at an angle to the axis of the tube 40a so that the rear wheels 28, 29 are canted, that is, by reference to FIGS. 4 and 5, the planes of the wheels are downwardly divergent to assist in providing stability to the stroller 20.

The seat 38 is so positioned relative to the frame that the center of gravity of an infant seated therein lies virtually directly over the main structural unit, that is, the rear axle assembly 40. Viewed in another way, this center of gravity of an infant in the seat 38 is in general vertical alignment with the axes of the rear wheels 28, 29.

The upright tubes 24, 26 are generally identically configured and dimensioned tubular aluminum members securely attached at the lower end thereof to couplers 44, 46, which may be of any convenient configuration, but, in the embodiment illustrated are formed of a tubular base portion 44a (and 46a) which encircles, and is secured to, the structural tube 40a, with a tubular stub 44b (and 46b) secured to the perimeter of portion 44a (and 46a) at an angle less than ninety degrees. The two stub portions 44b and 46b have first ends of the upright tubes fixedly secured, with the stub portions having a slight angle thereto resulting in the uprights being upwardly convergent, in rear view (See FIG. 4). At the distal free ends, the upright tubes 24, 26 are releasably attached to handlebar interconnectors, generally designated 54, 56. The tubular stock used from components 42a, 42b, 32a, 32b, 24, 26, and 34 are of the same general diameter (which is much smaller than the diameter of the rear axle tube 40a) for reasons which will become apparent, and which affects the dimensions of the interconnector members utilized.

Figures 6, 7:
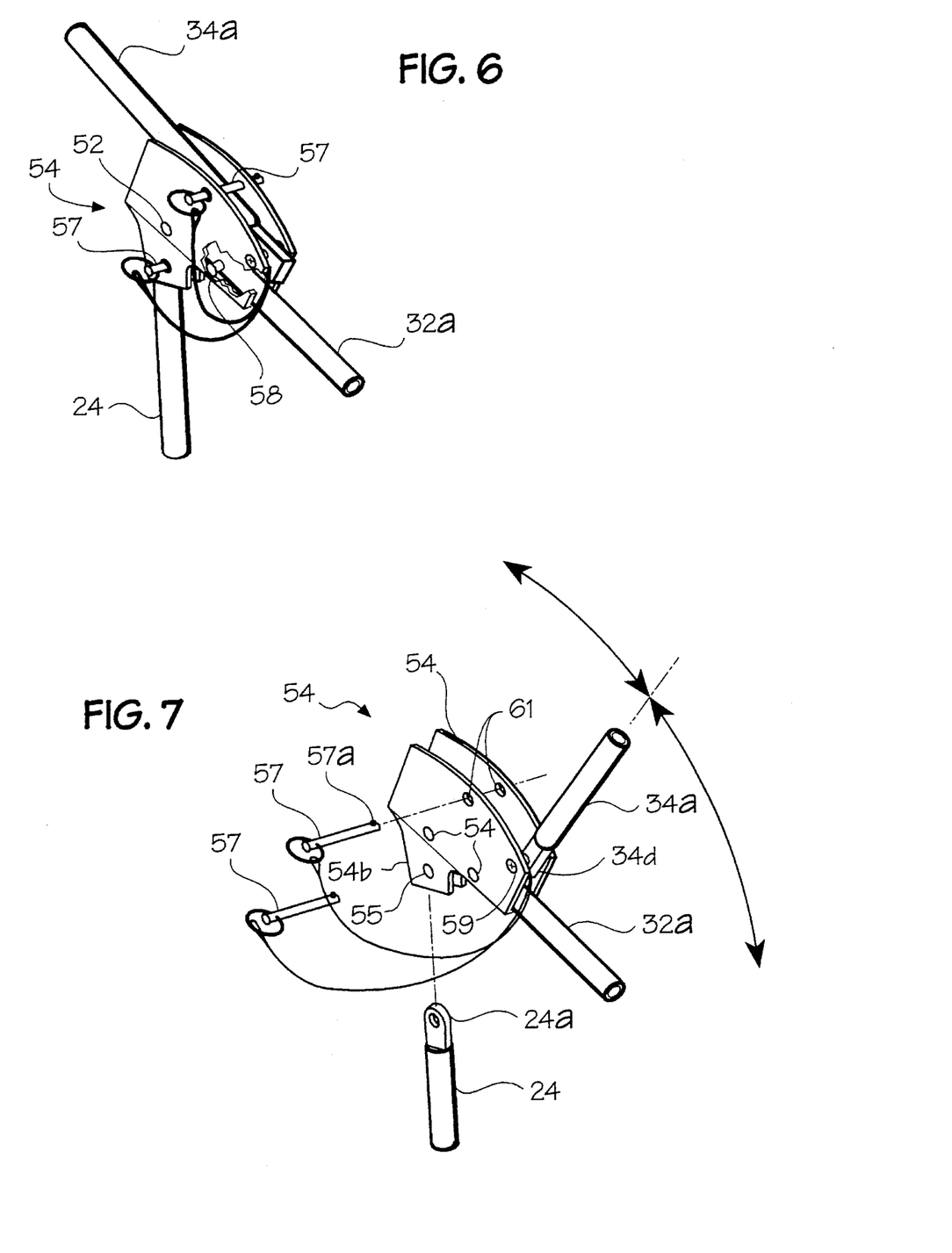
FIG. 6 is an enlarged fragmentary perspective view of the interconnection mechanism showing portions of the upright support tubes and the handlebar frame portions.
FIG. 7 is an exploded perspective view of frame tube portions and the interconnection mechanism of FIG. 6.

Referring also to FIGS. 6 and 7, by reference to one interconnector 54, the interconnector 54 has a saddle-shaped main body portion 54a with a depending clevis portion 54b, the portion 54a having a width between opposing sidewalls a dimension slightly greater than the diameter of the tubular members forming handlebar tubes 32a and 34a and upright 24. As shown, the distal end of the upright 24 has a bar-shaped flange portion 24a of a thickness less than the diameter of the upright 24 and slightly less than the distance between opposing sidewalls of the clevis 54b, the flange 24a having an aperture therethrough for alignment with like sized apertures 55 extending through the walls of the clevis 54b, the apertures being dimensioned for receiving a suitable fastener, such as a releasable coupling pin 57 having a spring loaded ball bearing 57 at the end thereof for enabling captive, yet releasable retention of the flange coupled to the clevis 24a.

The opposite end of pin 57 is provided with a coil passing therethrough, with one end of a cable attached thereto, the other end of the cable being fixedly attached to a convenient part of the adjacent mechanism to prevent misplacing or losing the fastener. Other fasteners are similarly configured with flexible attachment means to prevent loss, and will not be further described in detail.

The end of the handlebar tube 32a is positioned in the bight portion of the saddle member 54 and suitably fixedly secured thereto, such as with first and second rivets 58. The pivotable end of handlebar tube 34a is likewise provided with a flange 34d of dimensions and configuration similar to flange 24a. At the forward end (forward being the normal direction of travel of the stroller 20) of the interconnector 54, there are another pair of aligned apertures in opposing sidewalls of the main body portion 54a, the centers of these apertures being spaced from the axis of tube 32a distance slightly greater than the diameter of either tube, this spacing enabling the two parts 34a and 42a to overly one another in generally parallel generally abutting relation to minimize the overall height of the stroller in its collapsed position.

The flange 34a is received within the clevis 44 and pivotally couple thereto, such a by machine screw member 59. The handlebar member 34 is pivotable from a first operative position as shown in FIG. 6, in which the bar portion 34 is received within the length of the saddle opening 54a of the clevis 54, in overlying abutting relation with the lower fixed handlebar tube 32a. Another pair of aligned apertures 61 are formed in opposing sidewalls of the clevis 54 at a position that, with the two handle bar extension tubes 34 and 32a in overlying abutting relation, with a pin 57 passed therethrough, a snug fit is achieved that is, the pin 57 urges against the upper bar member 34 which urges it against the lower bar extension member 32a.

The saddle of the main body portion 54a has a depth and length sufficient to enable opposing sidewalls to receive significant lengths of both handlebar portions snugly and fully therein in the depth-wise and length-wise directions to provide stability at the coupling location so that wobbling and rattling is eliminated and the two handlebar portions act as an integral unit during use.

Returning again to FIG. 1 through 5, the push handlebar portion 34 is generally U-shaped with opposing sides converging toward the front. A gripping portion 34a is provided at the bight thereof with gripping material 35 wrapped in opposite directions from the center and extending around the corners. Centrally located on the bight portion is a lockable brake lever 63 for operation of a front wheel 30 caliper type brake 65 via a brake cable 64. In the operative positions, the lower handlebar extension members 32a and 32b are likewise arranged to be in alignment with the side arms of the upper handlebar portion 34 and converge toward the front wheel 30, at which point the ends thereof are each provided with plate shaped clevis members 67, 69, which are identical.

The clevis members 67, 69 are saddle-shaped and serve to have fixedly attached thereto the front ends of the fork members 42a, 42b, respectively, within the saddle, and pivotally attached thereto, the proximate ends of the handlebar portions 32a, 32b, respectively, the clevis members 67, 69 also serve to releasably receive the axle 70 of the front wheel 30, with the spacing between members 67, 69 being about the dimension of the hub of the wheel 30. That attachment of the wheel 30 to the clevises 67, 69 is conventional and of the type used in bicycles with quick-release front wheels, that is, there are provided opposing flange projections 67a with cutouts dimensioned for receiving the axle 70, with the end of axle 70 being provided with a lever arm nut member 71 for enabling hand-tightening of the axle 70 thereto.

The opposite ends of the fork tubes or members 42a, 42b are provided with flanged ends similar to those described in conjunction with FIGS. 6 and 7, and are pivotably coupled, via screws or the like, to first and second spaced clevis members 52a, 52b, which are arms projecting forwardly of the outer perimeter of the structural rear axle assembly 40. The dimension from the perimeter is such that, on folding, as will be hereafter described, the upright tubes 24, 26, when pivoted forward, will overly the fork members 42a, 42b in overlying proximate relation.

A span support member 75, which is formed of a generally trapezoidally configured plate shaped injected plastic material, has the ends thereof bent downwardly and is dimensioned for snugly attaching, such as by welding or riveting, to opposite sides of the handlebar portions 32a, 32b at a point proximate the outer diameter of the front wheel 30, this span member providing front end stability. The forward end of the plate-shaped span member 75 is provided with an upraised or bent portion 75a which together with the balance of the span member 75, serves as a splash guard in the event the front wheel 30 comes into contact with ground water during use.

Figures 4, 5:
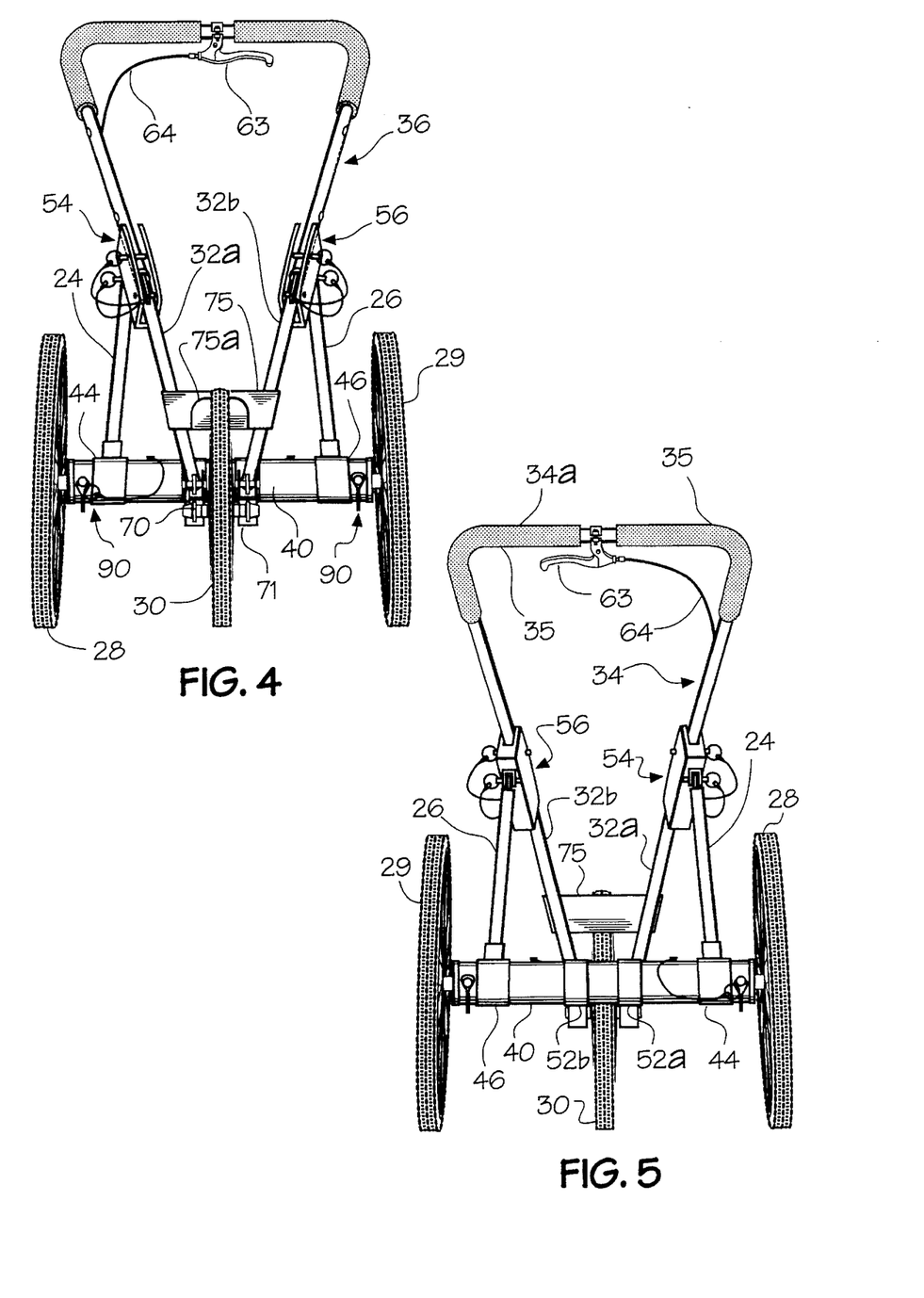
FIG. 4 is a front elevational view of the collapsible frame of FIG. 2.
FIG. 5 is a rear elevational view of the collapsible frame of FIG. 2.
Figure 8:
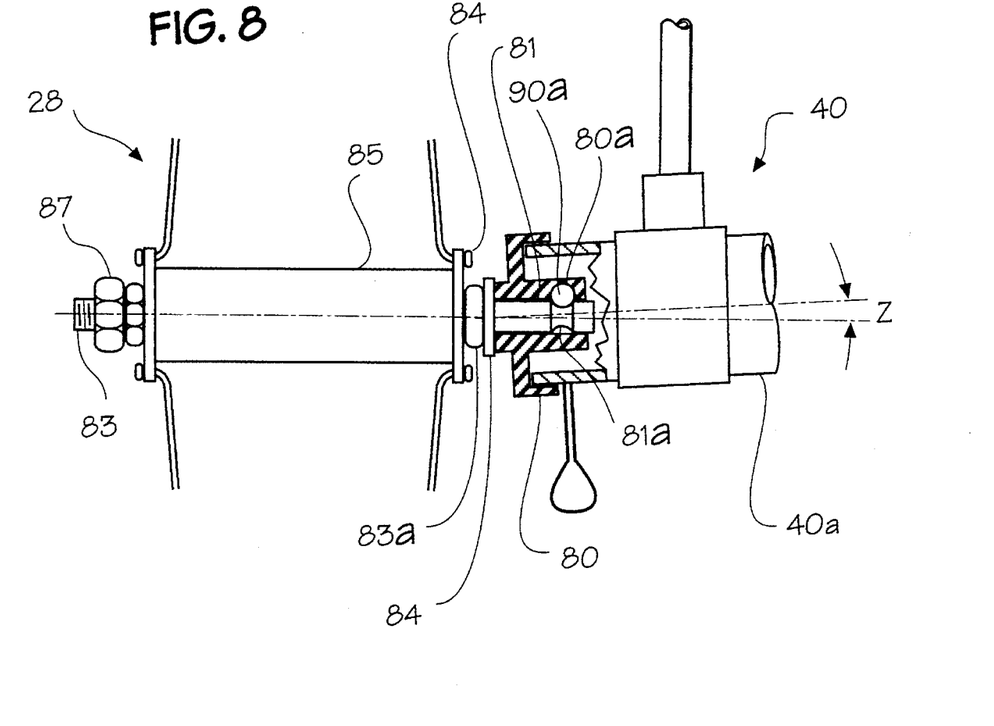
FIG. 8 is a cross-sectional view of the connection of a rear wheel to the frame of FIG. 1.
Figure 9:
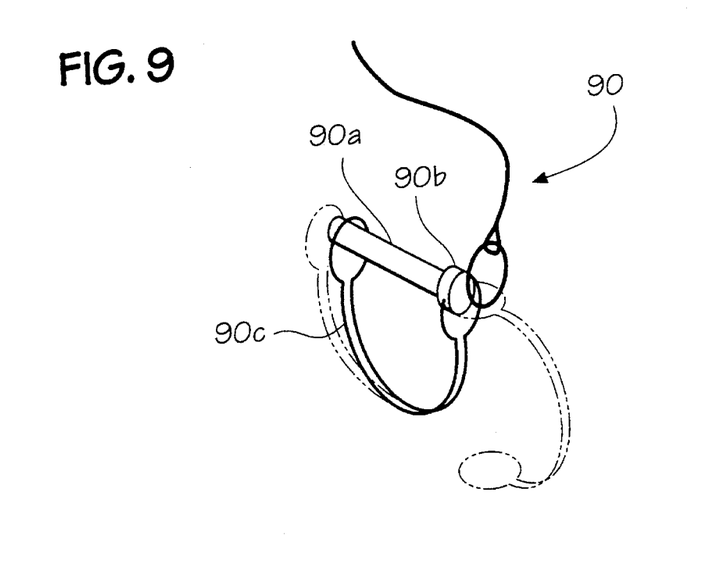
FIG. 9 is a perspective view of the connecting spring and pin type saddle clamp used for the rear wheel connection of FIG. 8.

FIGS. 8 & 9 depict interconnection of the rear wheels to the structural rear axle assembly 40. The opposite open ends of the rear axle tube 40a are configured for receiving cylindrical block members, such as block 80, which is drilled therein a bore 81 at an angle "Z" relative to the axial centerline of the tube 40a. The axle 83 of the rear wheel 28 is provided with an inner flange or collar 83, at which a washer 84 serves as one stop for the bushing or hub 85 of the wheel 28, the other end being secured by means of a suitable nut 87. The other end of the axle 83 is a diameter sufficient to enable snug slidable insertion into (and release from) the bore 81. These block 80 configurations result in the downwardly divergent relationship of the rear wheels 28 and 29 as shown in FIGS. 4 and 5. During assembly, with the axle 83 within bore 81, a hole is drilled through the entire assembly at a location so that a cup-shaped recess 80a is formed in the block 80 and an aligned cup-shaped recess 81a is formed in the axle 81, the two cup-shaped openings, when aligned, forming a circular aperture for insertion therethrough of a pin 90a of a spring type saddle fastener, generally designated 90, shown in FIG. 9.

The fastener 90 includes a steel pin 90a with an enlarged head 90b. A spring steel wire member 90c is configured as a single generally U-shaped loop and has the free ends thereof aligned for being pivotally received in opposite ends of an aperture drilled transversely through the flange 90b of the fastener 90, with the loop end having a dimension for enabling passage therethrough of the other end of the pin 90a. The spring steel wire member is flexed to the dotted line position show in FIG. 9 for releasing the pin and then pivoted about the axis at the other end. As shown in FIG. 4, these fasteners 90 are likewise flexibly secured to the frame assembly by suitable lengths of cable or the like.

Figure 10:
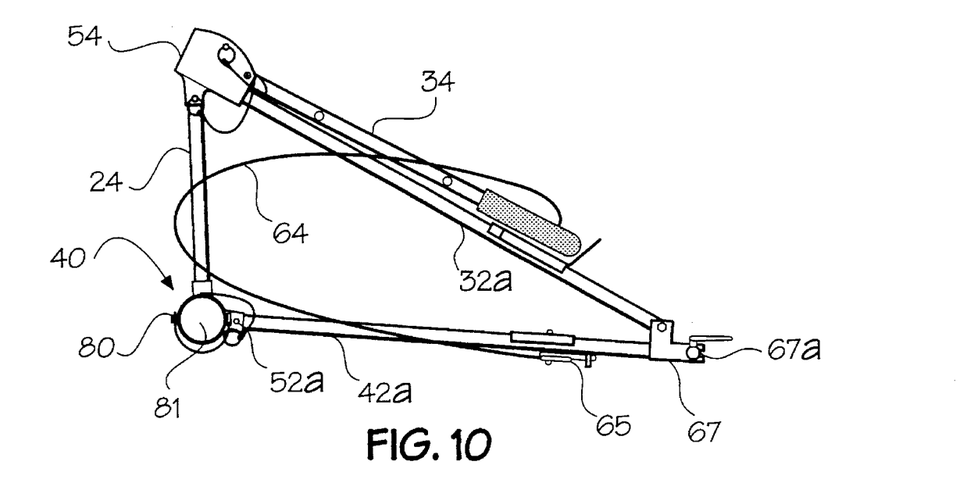
FIGS. 10 through 12 are side elevational views of the frame of FIG. 2, with the wheels removed and in various stages of collapsing for storage.
Figure 11:
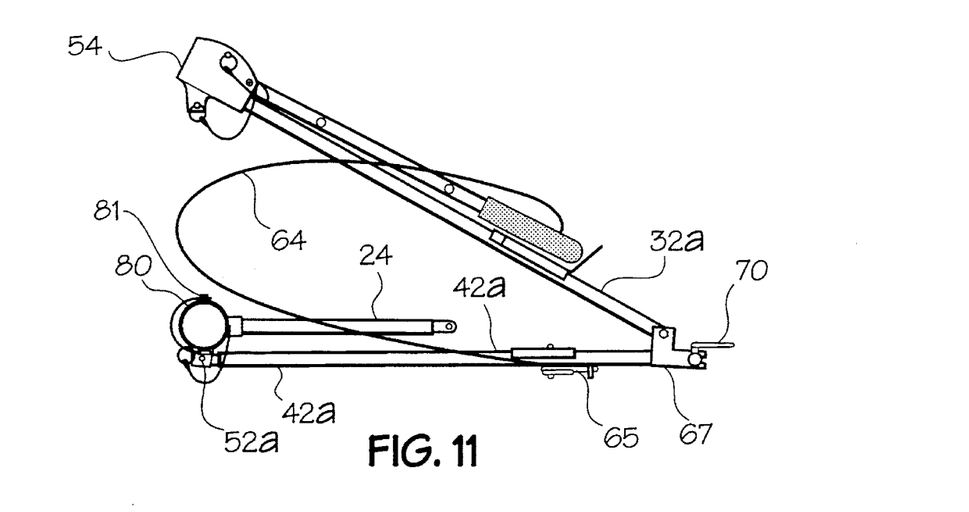
Figure 12:
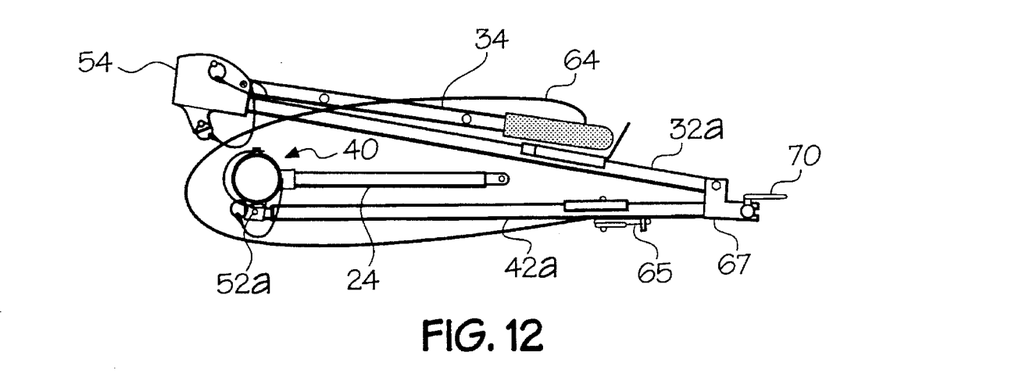

FIGS. 10 through 12 show the frame assembly at various steps of disassembly, with the wheels 28–30 already removed. In FIG. 10, the handlebar portion 34 is pivoted clockwise into an overlying proximate position relative to the lower handlebar tube 32a. In FIG. 11, the upright 24 is release at its upper end and pivoted clockwise toward fork 42a, whereupon, this pivoting takes place about the interconnecting pivot axis of the flange of fork 42a. In other words, the assembly including axle 40 along with upright 24 pivot, as a unit, until the upright 24 is in overlying approximately parallel relation with the fork 42a. The upper folded assembly, consisting of both handlebar portions 34 and 32a are then folded or pivoted counterclockwise until the compact frame arrangement of FIG. 12 is achieved. Although not shown, in the fully compact position, the interconnectors 54 and 56 will lie in abutting relation with the structural rear axle assembly 40. All of the pivot connections are such that the pivot axis of any pivotable member is offset relative to an adjacent interconnected fixed member to enable a low profile compact collapsible frame, wherein the maximum length is slightly greater than the length of the lower handlebar tube 42a and interconnector 54.

While the description has utilized directional references, such as up, down, right, left, clockwise, etc., it is to be understood that these terms are utilized with reference to the orientations in the figures and are not intended to be limiting. The construction of the jogger stroller 20 is of aluminum tubing which, with the exception of the axle tube 40a, are all of the same diameter, thus effecting economies of assembly. Furthermore, the exception of the handlebar portion 34, all of the tubular stock consists of straight or linear lengths of material. The interconnectors, such as 54, 56, 67, etc., are likewise formed of injected plastic of wall thickness sufficient to provide the required stability at the points of connection. In addition, the interconnectors which are configured to include pivot axes for one or more tubes are dimensioned and configured for providing support in the lengthwise directions of the tubes during operation of the stroller, with the spacing between opposing walls closely approximating the diameter of the tube sections therein for lateral as well a lengthwise stability.

In use, the stroller 20 is stable and efficient in the use of the energy of the operator, whether while walking or jogging. In side elevational view, as shown in FIG. 1, the sections which make up the handlebar form a generally straight line directed to interconnector 54 at an angle from the horizontzl, and then the sections from interconnector 54 to the center of the front wheel 30 at a substantially lesser angle to the horizontal. Thus, there is a definite angle between the axis of the rear handlebar portion 34, and the extension tubes 32a, 32b, however, optimum pushing force toward the axis of the front wheel is nor compromised.

Furthermore, with the large diameter canted rear wheels 28, 29, lateral stability is provided during movement. In addition, as previously mentioned, with the seat 38 positioned relative to the frame such that the center of gravity of an infant seated therein lies virtually directly over, or in general vertical alignment with, the axes of the rear wheels 28, 29, the stroller 20, whether being pushed slowly or rapidly, places the majority of the weight of the combination of the stroller and infant just forward of the rear wheels.

Certain approximate dimensions of the collapsible jogger are as follows:

Distance between front and rear axles—30".
Distance between rear wheels—20".
Dimensions unfolded (wheels off)—30"H, 43"L, 20"W.
Dimensions folded—36"×20"×7".
Handlebar height—39".
Wheel size—20"R, 16"F.

While there has been shown and described a preferred embodiment, other adaptations and modifications may be made without departing from the spirit and scope of the invention.

What is claimed is:

1. A stroller for conveying an infant or toddler, said stroller comprising:

a base tubular frame assembly for supporting three pneumatic wheels in tricycle relationship, and including a main structural rear axle rotatably supporting a pair of like generally large diameter ones of said wheels, said base frame assembly also including a pair of generally parallel fork members pivotally coupled to said axle at first ends thereof and supporting a smaller diameter one of said wheels at the other ends thereof;

a foldable handlebar assembly having a generally U-shaped handlebar portion and first and second linear tubular extension members coupled to said other ends of said fork members, said extension members, when in operative relation with said U-shaped handlebar portion, being in general alignment with the arms of said handlebar portion along a plane extending generally through the axis of said smaller diameter one of said wheels, said handlebar assembly including a pair of generally identical interconnectors coacting between said handlebar portion and said extension members and being configured for enabling folding of said handlebar assembly;

support means between said rear axle and each of said interconnectors; and seat means attached to said handlebar assembly, said seat means being dimensioned and positioned such that the center of gravity of an infant or toddler seated therein is in generally in vertical alignment with said rear axle.

2. The stroller of claim 1 wherein said main structural rear axle rotatably supports said pair of wheels with the planes of the wheels downwardly divergent.

3. The stroller of claim 1 wherein said rear axle includes a tubular member with blocks inserted into the ends thereof, said blocks including bores therein, and wherein each of said pair of wheels includes an axle with a portion insertable into each of said bores.

4. The stroller of claim 3 wherein each of said bores is along a line offset at an angle from the axis of said rear axle.

5. The stroller of claim 3 wherein said bore and said axle portion have mating recesses for receiving a pin through said rear axle for releasably retaining said axle portion within said bore.

6. The stroller of claim 1 wherein said interconnector is saddle shaped for fixedly interconnecting said handlebar portion and said extension members within said saddle with said handlebar assembly in its operative position.

7. The stroller of claim 6 wherein said support means includes first ends second tubes, first and of which are fixedly attached to said rear axle.

8. The stroller of claim 7 wherein each of said interconnectors includes a clevis portion for releasable coupling of the other end of said support tube.

9. The stroller of claim 6 wherein said extension member is securely attached within the closed end of the saddle of said interconnector and the arm of the handlebar portion is pivotally attached within the saddle and overlies said extension member with said handlebar assembly in its operative position.

10. The stroller of claim 9 wherein said interconnector includes aperture means for receiving a pin therethrough for retaining said extension member in overlying abutting relation with said arm.

11. The stroller of claim 1 wherein said seat means are formed of cloth-like material and is removable.

12. A stroller for use while walking or running, said stroller comprising:

three demountable wheels; and a collapsible frame assembly, including a) a primary structural rear axle assembly having a member of an enlarged cross-sectional dimension;

b) couplers at opposite ends of said axle assembly for supporting a pair of said demountable wheels with the axles thereof canted so that the wheels are downwardly divergent relative to a supporting surface;

c) a pair of upright members having first ends thereof fixedly coupled to said axle assembly in proximate relation to the ends thereof;

d) a pair of generally parallel fork members being pivotally coupled to said rear axle assembly by coupling means enabling the pivot axes thereof to be offset a given distance from the axis of the rear axle member so that, on folding, the fork and said upright support members are generally parallel to one another;

e) coupling means fixedly attached to the other ends of said fork members and being configured for supporting a third one of the demountable wheels;

f) a handlebar assembly including
  i) a first generally U-shaped handlebar member configured for gripping by the user and
  ii) first and second handlebar extension tubes;
  iii) first and second generally identically configured interconnectors, each being configured and dimensioned for fixedly receiving a first end of one of said handlebar tubes, and pivotally receiving an arm of said U-shaped handlebar member, the other ends of said handlebar tubes being pivotally coupled to said coupling means at the other ends of said fork members, said coupling means being configured and dimensioned to enable said fork members and said handlebar tubes, on folding, to generally overly one another, said interconnector having means for attachment of the other ends of said support members thereto.

13. The stroller of claim 12 wherein said support members, said fork members and said extension tubes are formed of straight sections of tubular material of generally the same diameter.

14. The stroller of claim 13 wherein said U-shaped handlebar member is formed of tubular material of generally the same diameter as said extension tubes.

15. The stroller of claim 12 wherein said interconnector has a saddle shaped main body portion having a depth greater than the combined dimensions of said handlebar tube and said arm and a length sufficient to receive a significant segment of both therein.

16. The stroller of claim 15 wherein said interconnector has a depending clevis portion for releasable attachment to said other ends of said support members.

17. A collapsible frame for use with a stroller or the like, said frame comprising:

a primary structural rear axle tubular assembly of an enlarged diameter;

block means within opposite ends of said axle assembly for supporting a pair of demountable wheels with the axles thereof canted so that the wheels are downwardly divergent relative to a supporting surface;

a pair of upright support tubes having first ends thereof fixedly coupled to said axle assembly;

a pair of fork tubes;

means at first ends of said fork tubes configured for supporting a third one of the demountable wheels;

coupling means affixed to said rear axle assembly for supporting said fork tubes in generally parallel relation, said coupling means including clevis portions offset a given distance from the axis of said rear axle member, said fork tubes being pivotally coupled to said clevis portions so that, on folding, said fork and said upright support tubes are generally parallel to one another;

a handlebar assembly including a first generally U-shaped tubular handlebar member configured for gripping by the user, and first and second handlebar tubes, first ends of said first and second handlebar tubes being pivotally coupled to said means at said first ends of said fork tubes;

first and second generally identically configured interconnect members, each of said interconnect members including a) means for fixedly receiving one end of said first and second handlebar tubes;

b) means for releasably coupling thereto the free end of one of said first and second support tubes; and c) means for pivotally coupling thereto the free ends of said upper U-shaped handlebar portion at a position which enables said handlebar tubes and said fork tubes, on folding, to generally overly one another.

18. The frame of claim 17 wherein said support tubes, said fork tubes and said handlebar tubes are formed of straight sections of tubular material of generally the same diameter.

19. The frame of claim 18 wherein said U-shaped handlebar member is formed of tubular material of generally the same diameter as said handlebar tubes.

20. The frame of claim 17 wherein said interconnector member has a saddle shaped main body portion having a depth greater than the combined dimensions of said handlebar tube and said free end of said handlebar portion and a length sufficient to receive a significant segment of both therein.

21. The frame of claim 20 wherein said interconnector member has a depending clevis portion for releasable attachment to said other ends of said support tubes.

22. The frame of claim 17 further including seat means in generally vertical alignment with said rear axle member.

23. The frame of claim 17 wherein said handlebar assembly, when unfolded to its operative position, in side elevation, lies generally along a line extending through the axis of the third one of said wheels.

24. The stroller of claim 17 wherein said uprights, said fork members and said handlebar tubes are formed of straight sections of tubular material of generally the same diameter.

25. The stroller of claim 17 wherein said U-shaped handlebar portion is formed of tubular material of generally the same diameter as said handlebar tubes.

26. The stroller of claim 17 wherein said interconnector member has a saddle shaped main body portion having a depth greater than the combined dimensions of said handlebar tube and said free end of said handlebar portion and a length sufficient to receive a significant segment of both therein.

27. The stroller of claim 17 wherein said interconnector member has a depending clevis portion for releasable attachment to said other ends of said uprights.

28. The frame of claim 17 further including seat means in generally vertical alignment with said rear axle assembly.

* * * * *